United States Patent
Hunter et al.

(10) Patent No.: US 6,170,358 B1
(45) Date of Patent: Jan. 9, 2001

(54) INDEXING MECHANISM

(75) Inventors: Stephen P Hunter, Bristol; Colin M Felgate, Dursley, both of (GB)

(73) Assignee: Reinshaw PLC, Wotton-Under-Edge (GB)

(*) Notice: Under 35 U.S.C. 154(b), the term of this patent shall be extended for 0 days.

(21) Appl. No.: 09/265,879

(22) Filed: Mar. 11, 1999

(30) Foreign Application Priority Data

Mar. 14, 1998 (GB) .................................................. 9805372

(51) Int. Cl.$^7$ .................................................. B25J 18/00
(52) U.S. Cl. .......................... 74/826; 74/825; 33/1 PT
(58) Field of Search .................. 33/1 PT, 503; 74/490.03, 813 R, 825, 826; 901/23, 24

(56) References Cited

U.S. PATENT DOCUMENTS

| Re. 35,510 | * | 5/1997 | McMurtry | 33/572 |
|---|---|---|---|---|
| 4,168,576 | | 9/1979 | McMurtry . | |
| 4,947,702 | * | 8/1990 | Kato | 74/490.03 |
| 5,185,936 | | 2/1993 | McMurtry . | |
| 5,341,702 | * | 8/1994 | Chaney et al. | 74/821 |
| 5,697,750 | * | 12/1997 | Fishkin et al. | 414/217 |
| 5,700,186 | * | 12/1997 | Hykes et al. | 451/406 |
| 5,771,748 | * | 6/1998 | Genov et al. | 74/490.03 |
| 5,838,121 | * | 11/1998 | Fairbairn et al. | 318/45 |
| 5,918,514 | * | 7/1999 | Crudgington et al. | 82/129 |
| 6,062,099 | * | 5/2000 | Suwa et al. | 74/490.01 |
| 6,082,948 | * | 7/2000 | Fishkin et al. | 414/217 |

FOREIGN PATENT DOCUMENTS

| 0 523 906 A1 | 1/1993 | (EP) . |
|---|---|---|
| 1 589 297 | 5/1981 | (GB) . |
| 2 298 488 | 9/1996 | (GB) . |

OTHER PUBLICATIONS

A. G. Davis Circle Divider and A.A. Gage Ultradex Tables (No date).

* cited by examiner

Primary Examiner—Diego Gutierrez
Assistant Examiner—Maria Fernandez
(74) Attorney, Agent, or Firm—Oliff & Berridge, PLC

(57) ABSTRACT

An indexing mechanism is provided to enable discrete angular displacement of a first body 10 relative to a second body 12. An intermediate body 22 is provided, and is rotatable relative to both the first and second bodies 10,12. Mutually engageable detent elements on the first and intermediate 10,22, and intermediate and second 22,12 bodies, provide indexing of the first body 10 relative to the intermediate body 22 and the intermediate body relative to the second body 12 respectively. The angular separations of adjacent indexed positions provided by the first and second sets of detent elements differ such that the first body 10 is indexable relative to the second body 12 in finer indexing increments than are provided by either the first or second detent elements individually. The detent elements may be provided by rings of gear teeth (Hirth Couplings), or circular arrays of elements providing mutually convergent surfaces (such as a ring of balls) that are engageable by three or more further elements (such as rollers).

12 Claims, 1 Drawing Sheet

INDEXING MECHANISM

The present invention relates to an indexing mechanism which enables the relative positioning of two relatively rotatable bodies in one of a plurality of discrete, or angularly indexed positions. Such indexing mechanisms are typically used in metrological apparatus, such as in an articulating probe head for a coordinate measuring machine.

Known indexing mechanisms typically comprise two sets of detent members, which are mutually engageable in a plurality of angularly indexed, repeatable relative positions. One type of such an indexing mechanism is known from U.S. Pat. No. 4,168,576, U.S. Pat. No. 5,185,936 and United Kingdom Patent No. 2,298,488 and includes a circular array of hemispherical detent elements on one of the relatively rotatable bodies, and three elongate cylindrical detent elements on the other of the bodies. At each indexed position, each of the cylindrical bodies engages both mutually convergent surfaces of an adjacent pair of hemispherical elements. The number of indexed positions provided by such a mechanism thus corresponds to the number of sets of convergent surfaces or "pockets" in the circular array, which in turn relates directly to the number of hemispherical elements in the array.

In a further type of indexing mechanism, two identical sets of detent elements are provided, each set of detent elements having a form similar to that of a circular ring of axially projecting gear teeth. Once again, the number of angularly indexed positions provided by the mechanism corresponds to the number of pockets defined by adjacent "gear teeth" in the circular array.

In each of the above mechanisms, the magnitude of the indexing angle, i.e. the angle of which separates adjacent angularly indexed positions, is determined by the physical size of the detent elements. As a consequence, to provide a smaller indexing angle (i.e. a greater number of angularly indexed positions over a given possible relative angular displacement of two bodies), the size of the detent elements must be reduced, with a corresponding increase in the complexity of manufacturing. Furthermore, in motorised indexing mechanisms, a relatively precise, and backlash-free servo mechanism must typically be provided in order to rotate one body relative to another such that the two bodies will engage in the "target" pocket.

The present invention seeks to overcome this problem by providing a pair of serially connected indexing mechanism, in which the indexing angle of the two mechanisms differs by a relatively small amount such that, in combination, the two mechanisms may act as a "vernier" indexing device.

Figure 1:
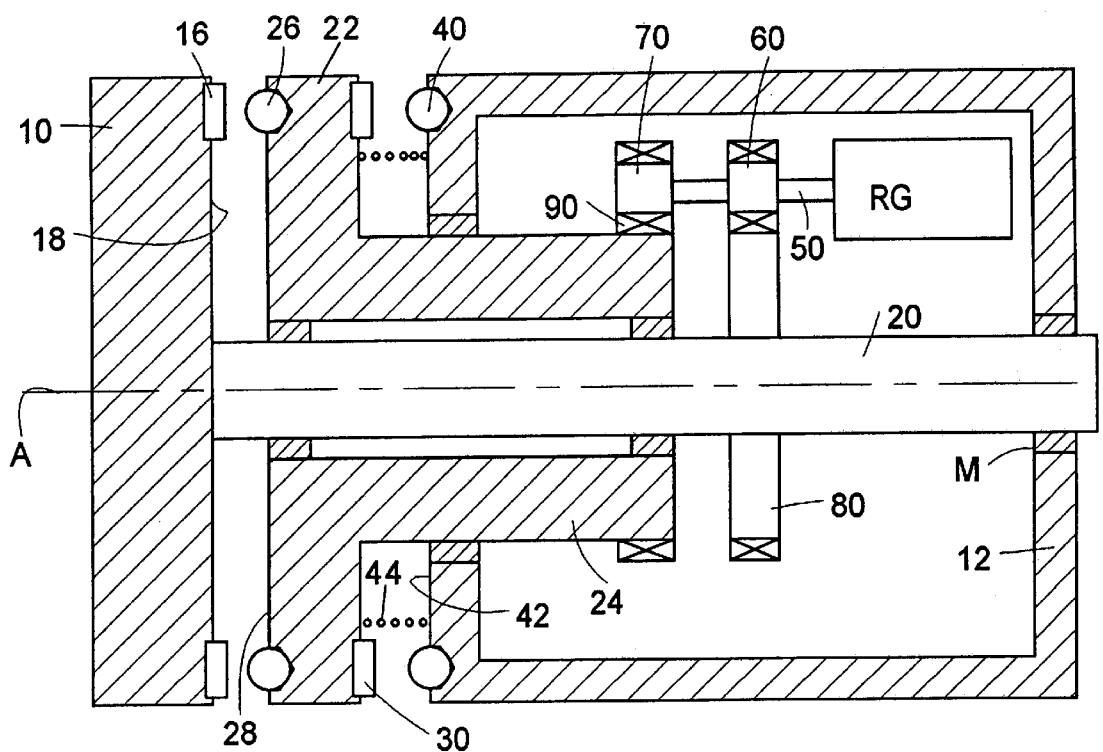
Figure 2:
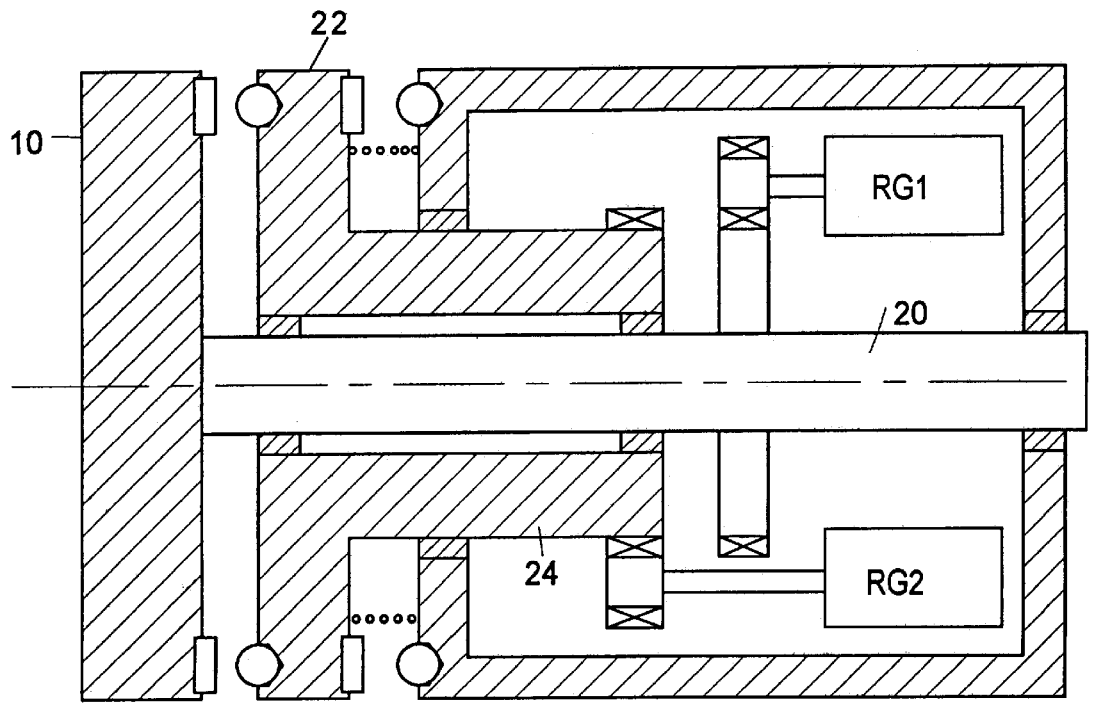

Embodiments of the present invention will now be described, by way of example, and with reference to the accompanying drawings in which:

FIG. 1 is a section through a first embodiment of indexing mechanism according to the present invention; and FIG. 2 is a section through a second embodiment of indexing mechanism according to the present invention.

Referring now to FIG. 1, an indexing mechanism is provided between first and second relatively rotatable bodies 10,12, to enable a touch trigger probe, which may be mounted to the first body 10, to be positioned in one of a plurality of angularly indexed, and repeatable positions relative to the second body 12. The indexing mechanism includes three elongate cylindrical rollers 16, mounted to the mating face 18 of the first body 10. The rollers 16 are equispaced and extend substantially radially with respect to the axis A of relative rotation of the first and second bodies 10,12. The first body 10 is directly mounted to a shaft 20, journalled on the first body 12, and by means of which rotation of the first body 10 is effected in a manner to be described.

An intermediate body 22, through which the shaft 20 projects with a clearance, is mounted to a further shaft 24, which is also journalled on the first body 12, and which extends substantially coaxially with shaft 20. The intermediate body 22 includes a circular array of detent elements provided by ball bearings 26, mounted in the outer mating face 28 of the intermediate body. Mutually convergent surfaces of adjacent ball bearings define a pocket into which a cylindrical roller 16 may seat. In the present example, 48 ball bearings 26 are provided in the circular array thus providing 48 pockets, into which the first body 12 may be indexed spaced apart at angular increments, or "indexing angles" of 7½° (360/48).

Three further cylindrical rollers 30 are mounted to the rear mating face 32 of intermediate body 22 in the same way as the rollers 16 are mounted to the mating face 18 of the first body. Each of the further rollers may seat in one of 45 pockets provided by the mutually convergent surfaces of adjacently positioned detent elements, in the form of further ball bearings 40 provided in a circular array on the mating face 42 of the second body 12. The indexing angle between adjacent pockets provided by the circular array of further ball bearings 40 is 8° (360/45).

Engagement, or locking, of the first and second bodies 10,12 into an indexed position, and disengagement, or unlocking, of the first and second bodies 10,12 from an indexed position is actuated by means of an axially acting motor M, which is operable between the first body 12 and the shaft 20. Motor M does not interfere with relative rotation of the shaft 20 and first body 12. Actuation of the motor M initially results in the first body 10 being axially displaced in the direction of the second body 12 until the cylindrical rollers 16 engage with three corresponding pairs of convergent surfaces provided by the ball bearings 26 Thereafter, both the first body 10 and the intermediate body 22 are axially displaced by the motor M against the action of a biasing spring 44, which operates to urge intermediate body 22 away from the second body 12. Continued retraction of the first body 10 and intermediate body 22 will eventually result in engagement by the further cylindrical rollers 30 of three pairs of mutually convergent surfaces provided by the further ball bearings 40. In this locked position, the first body 10 is thus supported in an angularly indexed position relative to the second body 12 by means of the serial engagement of the rollers 16, ball bearings 26, further rollers 30, and further ball bearings 40. Disengagement, or unlocking of the first and second bodies 10,12 is simply the inverse of the previously described operation.

A rotary motor-gearbox unit RG is mounted in the interior of the second body 12, and includes a rotating shaft 50. The shaft 50 supports a pair of axially displaced drive sprockets 60,70. Drive sprocket 60 engages a driven gear 80, which is fixedly connected with the first shaft 20, while drive sprocket 70 engages a driven gear 90, fixedly mounted to the intermediate shaft 24. The ratios of the drive sprocket-gear pairs 60, 80; 70, 90 are such that the intermediate body 22 will rotate substantially faster than the first body 10 upon rotation of the shaft 50 of the motor gearbox unit RG. In one example, the relative ratio between the rotation rates of the first body 10 and intermediate body 22 is 1:16; i.e. for every rotation of the first body 10, the intermediate 22 will undergo 16 rotations. Thus, if the motor gearbox unit RG is actuated to rotate the first body 10 through ½° relative to the second body 12, the intermediate body 22 will undergo a rotation of 8° relative to the second body 12. In this situation therefore, the rotation of the intermediate body 22 relative to the first body 12 will correspond to the indexing angle between pockets provided by the further ball bearings 40. Additionally, since the ball bearings 26 will also have rotated 8° relative to the first body, and the cylindrical rollers 16 have rotated ½° relative to the second body 12, a relative rotation between the first and intermediate bodies 10,22 of 7½° has occurred. Once the axial locking motor M is actuated to re-engage the first, intermediate and second bodies 10,22,12, the first body 10 will have been indexed through an angle of ½° relative to the second body 12. Preferably, the gear ratios between the sprockets 60,70 and driven gears 80,90 is such that the motor will rotate approximately three times faster than the intermediate body 22, thus providing a very low gear ratio between rotation of the motor and the rotation of the first body 10.

It should be noted that, although the first body 10 is rotated only ½° relative to the second body 12, the precision to which the first body 10 must be rotated is determined by the size of the pocket on the intermediate body 22, i.e. ±3.5° into which the rollers 16 on the first body are to be brought into engagement. This arrangement therefore makes it possible to index the first body 10 relative to the second body 12 in very small increments without the need for either correspondingly small detent elements, or precision servo drives with very low backlash and servo stiffness which would otherwise be required in order to rotate one body relative to another to a requisite accuracy of ±0.25° necessary to provide reliable engagement into a pocket size of 0.5° (this being the magnitude of the indexing angle achieved with two serially coupled indexing mechanisms shown above).

Further elegant numerical combinations of the number of pockets provided to index the first and intermediate, and the intermediate and second bodies, in combination with appropriate gearing ratios are shown in the table below.

| NO OF FIRST POCKETS | NO OF SECOND POCKETS | RESULTANT INDEXING ANGLE | GEAR RATIO |
|---|---|---|---|
| 90 | 96 | 0.25° | 16:1 |
| 80 | 81 | 0.50° | 9:1 |
| 85 | 96 | 0.75° | 5.65:1 |
| 96 | 99 | 1.25° | 3:1 |
| 15 | 16 | 1.50° | 16:1 |

In a further embodiment, shown in FIG. 2, independent motor gearbox units RG1, RG2 are provided to rotate the shafts 20,24 connected to the first and intermediate bodies 10,22 respectively. This configuration has the disadvantage of requiring two motor gearbox units, and, as a result, two servo systems to control them, although independent control of the rotation of the first 10 and intermediate 22 bodies does, with certain combination of arrays (i.e. combinations of the number of elements in each array) enable indexing through finer angles.

In a further embodiment, the gear ratios are chosen such that a ratio of 16:1 in relative rates of rotation between the first and intermediate bodies 10,22 is achieved by a reduction gear of 4:1 between the shaft 50 of motor gearbox RG and the shaft 20, connected to the first body 10, and a step-up gear of 4:1 between the shaft 50 of motor gearbox RG and the shaft 24, connected to the intermediate body 22.

We claim:

1. An indexing mechanism having a first body and a second body which are relatively rotatable substantially about an axis, for relatively locating the first body and the second body in one of a plurality of discrete angularly indexed positions about the axis, comprising:
    an intermediate body rotatable relative to the first body and the second body substantially about the axis;
    a first set of mutually engageable detent elements provided on the first body and the intermediate body, elements of the first set of mutually engageable detent elements being mutually engageable in a plurality of first discrete angularly indexed positions about the axis, the first angularly indexed positions having a first angular separation; and
    a second set of mutually engageable detent elements provided on the intermediate body and the second body, elements of the second set of mutually engageable detent elements being mutually engageable in a plurality of second angularly indexed positions about the axis, the second angularly indexed positions having a second angular separation, different to the first angular separation.

2. An indexing mechanism according to claim 1 wherein the first detent elements are mutually engageable and disengageable by means of relative axial movement of the first and the intermediate body.

3. An indexing mechanism according to claim 1 wherein the intermediate and the second body are mutually engageable by means of a relative axial movement of the intermediate and the second body.

4. An indexing mechanism according to claim 1 wherein the first detent elements are provided by identical elements on the first and the intermediate bodies.

5. An indexing mechanism according to claim 4 wherein the first and second detent elements are each provided by a Hirth coupling.

6. An indexing mechanism according to claim 1 wherein the second detent elements are provided by identical elements on the intermediate and the second bodies.

7. An indexing mechanism according to claim 6 wherein the first and second detent elements are each provided by a Hirth coupling.

8. An indexing mechanism according to claim 1 wherein the first and second detent elements are each provided by mutually engageable elements that provide a kinematic support of the first and intermediate, and the intermediate and second bodies when in mutual engagement at any of the plurality of first and second discrete angularly indexed positions respectively.

9. An indexing mechanism according to claim 1 further comprising at least one motor which provides relative rotation of the first and intermediate bodies, and the intermediate and second bodies.

10. An indexing mechanism according to claim 9 having a single motor mounted on the first body, and rotating both the intermediate and the second bodies relative to the first body, wherein the mechanism further comprises one transmission between the motor and the intermediate body, and another transmission between the motor and the second body, wherein the two transmission have different drive ratios.

11. An indexing mechanism according to claim 10 wherein the one transmission is provided by gears connected to the motor and the intermediate body, and the another transmission is provided by gears connected to the motor and the second body.

12. An indexing mechanism according to claim 9 having first and second motors for causing relative rotation of the first body and intermediate body, and the first body and second body respectively.

* * * * *